US012597721B2

(12) United States Patent
Stolze et al.

(10) Patent No.: US 12,597,721 B2
(45) Date of Patent: Apr. 7, 2026

(54) CONDUCTOR TERMINAL AND SET FORMED OF CONDUCTOR TERMINAL AND ACTUATING ELEMENT

(71) Applicant: WAGO Verwaltungsgesellschaft mbH, Minden (DE)

(72) Inventors: Henry Stolze, Bad Frankenhausen (DE); Max Boettcher, Ebeleben (DE); Silvio Lobing, Worbis (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 282 days.

(21) Appl. No.: 18/244,821

(22) Filed: Sep. 11, 2023

(65) Prior Publication Data

US 2024/0088583 A1 Mar. 14, 2024

(30) Foreign Application Priority Data

Sep. 13, 2022 (DE) ..................... 20 2022 105 157.7

(51) Int. Cl.
*H01R 9/26* (2006.01)
*H01R 9/22* (2006.01)

(52) U.S. Cl.
CPC ........... *H01R 9/2608* (2013.01); *H01R 9/223* (2013.01)

(58) Field of Classification Search
CPC ...... H01R 9/26; H01R 9/2608; H01R 9/2616; H01R 9/2625; H01R 9/223
See application file for complete search history.

(56) References Cited

U.S. PATENT DOCUMENTS

| | | | | | |
|---|---|---|---|---|---|
| 4,900,275 | A * | 2/1990 | Fasano | H02B 1/052 | 439/716 |
| 7,488,913 | B1 * | 2/2009 | Durham | H02B 1/052 | 439/810 |

FOREIGN PATENT DOCUMENTS

| | | | |
|---|---|---|---|
| DE | 202010006065 | U1 | 8/2010 |
| DE | 202010013453 | U1 | 11/2010 |
| DE | 202015009391 | U1 | 5/2017 |
| DE | 102016113813 | A1 | 2/2018 |
| DE | 102019117050 | A1 | 2/2020 |
| DE | 102021201000 | A1 | 8/2022 |

* cited by examiner

*Primary Examiner* — Renee S Luebke
*Assistant Examiner* — Paul D Baillargeon
(74) *Attorney, Agent, or Firm* — Muncy, Geissler, Olds & Lowe, P.C.

(57) ABSTRACT

A conductor terminal having a terminal housing with a locking device for snapping the terminal housing onto a DIN rail, wherein the locking device has a first locking foot that can be elastically displaced relative to the terminal housing, which has a recess for holding an actuating element with which the first locking foot can be elastically displaced. A set formed of such a conductor terminal and an actuating element is also provided.

14 Claims, 4 Drawing Sheets

CONDUCTOR TERMINAL AND SET FORMED OF CONDUCTOR TERMINAL AND ACTUATING ELEMENT

This nonprovisional application claims priority under 35 U.S.C. § 119(a) to German Patent Application No. 20 2022 105 157.7, which was filed in Germany on Sep. 13, 2022, and which is herein incorporated by reference.

BACKGROUND OF THE INVENTION

Field of the Invention

The invention relates to a conductor terminal comprising a terminal housing with a locking device for snapping the terminal housing onto a DIN rail, wherein the locking device has a first locking foot that can be elastically displaced relative to the terminal housing, which has a recess for holding an actuating element with which the first locking foot can be elastically displaced. The invention also relates to a set formed of such a conductor terminal and an actuating element.

Description of the Background Art

A generic conductor terminal is known from DE 20 2010 013 453 U1, which is incorporated herein by reference. The conductor terminal has a recess to hold an actuating element with which the first locking foot can be elastically displaced. A suitable tool selected by the user can be used as an actuating element, wherein the use of a flat screwdriver is particularly recommended, as this can be easily inserted into the recess. However, there is a risk of damage to the conductor terminal if the user does not select a suitable tool or does not use it in a suitable manner.

SUMMARY OF THE INVENTION

It is therefore an object of the invention to provide an improved conductor terminal. In addition, a set formed with such a conductor terminal and an actuating element is to provided.

This object is achieved in an example, by the fact that a fastening element is arranged on the terminal housing and/or on the locking device at a distance from the recess, to which the actuating element can be fixed in a loss-proof manner by means of a positive fit and/or frictional connection. For example, the actuating element can be fixed to the fastening element in such a way that it remains on the terminal housing in all possible spatial positions of the terminal housing and does not fall off. The invention has the advantage that the conductor terminal enables permanent fixation of the actuating element to the terminal housing and thus contributes to a safer actuation of the first locking foot. In particular, the conductor terminal according to the invention is suitable for an actuating element which is specially designed for this purpose, such as a suitably designed actuating lever, which has a fastening section suitably shaped for the formation of a positive fit with the fastening element, which is designed, so to speak, as a counterpart to the fastening element of the terminal housing. As you can see, the recess and the fastening element are different elements. For example, the actuating element can be fixed to the recess and additionally to the fastening element in a loss-proof manner by means of a positive fit and/or frictional connection.

Advantageously, this actuating element can be designed as a separate component, i.e., as a separate component from the terminal housing. This makes it possible to manufacture the terminal housing practically unchanged, only with the addition of the fastening element. The fastening element is in a position of the terminal housing, which housing is otherwise not used for further functions. There is no need to significantly change the corresponding molds for the manufacture of the terminal housing. The actuating element can be manufactured in a separate manufacturing process so that it can be optimized for its application, both in terms of the materials used and the manufacturing process. In addition, this simplifies the possibility of providing the actuating element in a different color, e.g., a warning color, than the color of the terminal housing.

If necessary, the conductor terminal according to the invention can also continue to be used as an actuating element with a screwdriver. However, it is more advantageous to use an actuating element adapted to this, as explained above. Since in the case of the conductor terminal according to the invention, the actuating element adapted to it can be permanently attached to the terminal housing, the actuation of the first locking foot is simplified and made more intuitive for the user. In particular, the user does not have to look for a special tool for this actuation, as the actuating element is attached directly to the terminal housing and can remain there. This is also a great advantage for certain regions of the world where the required flat screwdrivers are not part of the usual range of tools.

In particular, the invention also enables the conductor terminal to snap onto a DIN rail without any force. In particular, no changes to the design features of the first locking foot are required. The actuating element enables a self-explanatory and safe application for every user.

The locking device can be part of the terminal housing, for example it can be molded in one piece, or it can be attached to the terminal housing as one or more separate components.

The fastening element can have a recess with a semicircular inner contour. This has the advantage that the fastening element also allows for the actuating element attached to it to be rotationally supported. The recess can be designed, for example, as a blind bore, which has a slit-like opening on one side of the circumference.

The semicircular inner contour can extend over a radians of more than 180°. In this way, the actuating element can be securely attached to the fastening element by means of a positive fit and can still be swiveled in the recess by a certain angle of rotation.

The fastening element may also have a protruding protrusion with a semicircular outer contour. In this case, the semicircular outer contour can extend over a radians of more than 180°. The fastening element can then be designed in the manner of a fastening pin.

The fastening element can be disposed at a distance from the recess to hold the actuating element, which distance is greater than the depth of the recess. In this way, part of the actuating element can be disposed between the fastening element and the recess. If the actuating element is designed as an actuating lever, e.g., a load arm of the actuating lever can be arranged between the fastening element and the recess, e.g., clamped in between. The depth of the recess is considered to be the extension of the recess in the direction in which the actuating element is to be inserted into it.

In this case, the part of the actuating element protruding into the recess does not have to be firmly supported there but can be mounted there in a movable manner in the manner of a floating bearing, so that when the actuating element is actuated, i.e., the first locking foot is displaced, the part of the actuating element protruding into the recess performs at least a slight relative displacement movement in relation to the material of the first locking foot surrounding the recess.

The fastening element can have an opening pointing in the direction of the recess of the first locking foot. The opening of the fastening element can be located opposite the recess of the first locking foot, so that the opening in the fastening element is visible from a viewing point within the recess. As a result, the actuating element can be fastened particularly advantageously in a loss-proof manner. In particular, at least part of the actuating element can be arranged between the fastening element and the recess, e.g., clamped between them. An unintentional disengagement of the actuating element from the recess can be prevented or at least made more difficult. In particular, such disengagement is not possible when the actuating element is actuated.

The fastening element can have an opening pointing away from the recess of the first locking foot. In this case, the opening of the fastening element is not located opposite the recess, so that the opening in the fastening element is not visible from a viewing point within the recess. The fastening element may also have an opening pointing in the direction of the recess of the first locking foot and an opening pointing away from the recess of the first locking foot.

The recess for receiving the actuating element can be tapered in cross-section in a direction pointing away from the fastening element. In particular, the recess may have a triangular or trapezoidal inner contour in cross-section.

The locking device may have a second locking foot, which has greater rigidity than the first locking foot. The DIN rail can then be held between the first and second locking feet when the conductor terminal is disengaged with the locking device on the DIN rail. The first locking foot may have a stop that limits the elastic displacement of the first locking foot, at least in one direction.

The above-mentioned object is also achieved by a set formed of a conductor terminal of the type explained above and an actuating element which has a fastening section and a displacement section, wherein the fastening section is set up to be fixed to the fastening element of the terminal housing in a loss-proof manner by means of a positive fit and/or frictional connection, and the displacement section is set up to engage in the recess to hold the actuating element when the actuating element is fixed to the fastening element of the terminal housing via its fastening section. Here, too, the advantages explained above can be realized.

The fastening section has an outer contour that is designed as a counterpart to the inner contour of the fastening element. If the fastening element has the previously mentioned outer circular contour, the fastening section may have an inner contour that is formed as a counterpart to the outer contour of the fastening element.

The actuating element is thus a component that is separate from the conductor terminal or its terminal housing, which can be attached to the terminal housing by means of the fastening element, for example by the manufacturer of the conductor terminal or later by the user of the conductor terminal. If necessary, the actuating element can also be removed from the conductor terminal. The actuating element is comparatively rigid, at least with greater stiffness than the stiffness of the elastically displaceable first locking foot. The actuating element can be designed as a plastic component. To increase rigidity, the actuating element can be fiber-reinforced, i.e., made of fiber-reinforced plastic, for example. Alternatively or additionally, the actuating element may also have at least one stiffening element, for example a metal component.

The displacement section can be formed at a free end of the fastening element. In this case, the displacement section may have an outer contour which, in terms of shape, is formed as a counterpart to the inner contour of the recess into which the displacement section is immersed.

The actuating element can have a manual actuation section designed for manual actuation of the actuating element for the purpose of displacing the first locking foot. This has the advantage that the actuating element can be operated easily and intuitively by the user. In particular, the manual actuation section may have an actuation surface on which the user must apply a compressive force in order to effect the desired elastic displacement of the first locking foot. This displacement of the first locking foot increases its distance to the DIN rail, so that the conductor terminal can be easily removed from the DIN rail or, if a forceless snapping is desired, can also be attached there without overcoming a locking force.

The manual actuation section may have a smooth surface or a surface with a specific contouring, such as a groove or corrugation. The manual actuation area can also have a robot-optimized actuation surface so that the actuating element can also be easily operated by a robot, e.g., for automatic loading of DIN rails with conductor terminals by robots. The actuation surface can be a flat or curved surface, or a combination of such surfaces.

The actuating element can be designed as a pivoting actuating lever that can be pivoted around a swivel bearing, wherein the swivel bearing is formed at least in part by the fastening element of the terminal housing and the fastening section of the actuating element held in the fastening element. This allows for particularly efficient manual actuation and corresponding displacement of the first locking foot by means of the actuating element.

The manual actuation section can be formed on a lever arm of the actuating lever protruding from an area of the actuating element in which the fastening section is disposed in a different direction than a load arm of the actuating lever on which the displacement section is formed. For example, the actuating lever may be designed as an elongated actuating lever in which the lever arm runs exactly or substantially in the diametrical direction to the load arm. The actuating lever can also be designed as an angle lever. In this case, a certain angle can be formed between the lever arm and the load arm, e.g., in the range of 60-120°.

The actuating element may be wholly or predominantly formed in a color that contrasts with the color of the terminal housing. In this way, the intuitive operability of the actuating element can be further improved for the user. For example, the actuating element can be designed in a warning color, for example red, orange or yellow. This way, incorrect operation can be avoided.

For example, the invention may be formed in the form of a conductor terminal, for example, a terminal block having the terminal housing of the type explained above and at least one spring-loaded terminal connection arranged in the terminal housing. The conductor terminal may also have a spring actuating element for manual actuation of a clamping spring of the spring-loaded terminal. In an advantageous embodiment of the invention, the actuating element may be designed in the same color as the spring actuating element. This makes it clear to a user which elements of the conductor terminal are to be operated manually by the choice of color.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
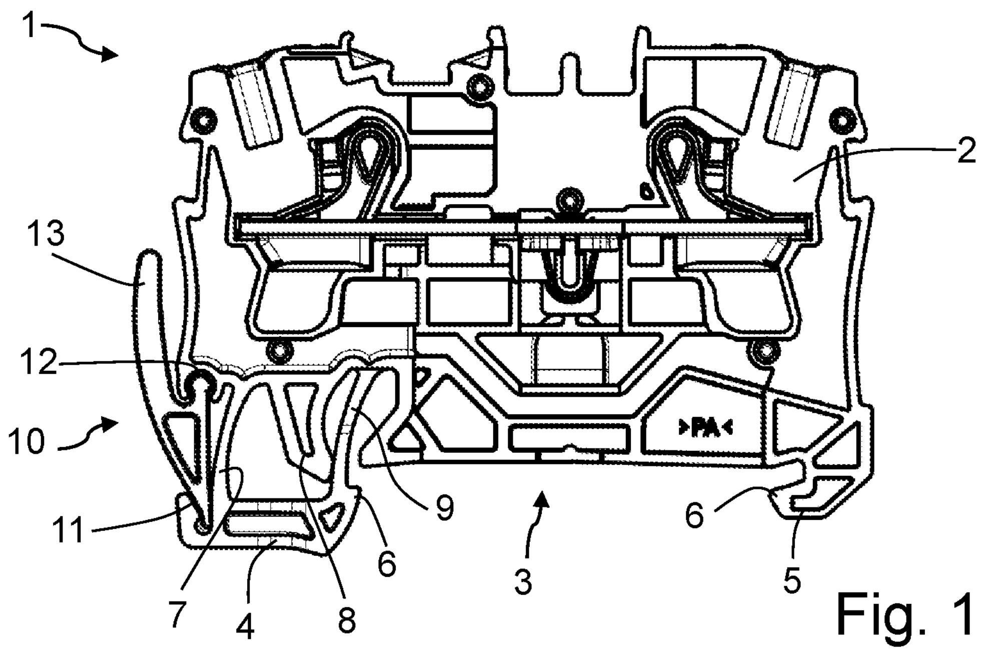
FIG. 1 shows a conductor terminal with an actuating element in a side view.

FIG. 1 shows a conductor terminal 1 with a terminal housing 2, e.g., in the form of a terminal block. The terminal housing 2 can be designed as an insulating housing. One or more spring-loaded terminals may be arranged in the terminal housing 2, and one or more busbars may also be arranged in it.

In the lower area of the terminal housing 2, a locking device 3 is formed for snapping the terminal housing 2 onto a DIN rail. The locking device 3 essentially has a first locking foot 4 and a second locking foot 5 opposite the first locking foot 4. The locking feet 4, 5 have locking lugs 6, which can engage in a DIN rail and secure the terminal housing 2 to the DIN rail.

The first locking foot 4 is designed as an elastically displaceable locking foot. This can be realized, for example, in such a way that the first locking foot 4 is connected to the rest of the terminal housing 2 by means of webs 7, 9. Due to the fact that the webs 7, 9 are comparatively long and thin, the desired elastic displacement of the first locking foot 4 can be realized. In order to keep this displacement within limits, a stop 8 can be present, which can extend into a free space formed between the webs 7, 9, for example. Once the first locking foot 4 has reached its maximum permissible displacement, the web 9 hits the stop 8, which prevents further displacement of the first locking foot 4.

At the first locking foot 4 there is a recess 11 to hold an actuating element. Furthermore, there is a fastening element 12 on the terminal housing 2 and/or on the first locking foot 4, to which an actuating element 10 is fixed by positive fit and/or frictional connection. In this case, part of the actuating element 10 protrudes into the recess 11. The individual elements of the actuating element 10 are described in more detail below. FIG. 1 already shows a manual actuation section 13 of the actuating element 10, which is designed for manual actuation of the actuating element 10. If a compressive force is exerted on the manual actuation section 13, the actuating element 10 pulls the first locking foot 4 slightly to the left, i.e., slightly away from the opposite second locking foot 5.

In this case, the opening of the fastening element 12 is arranged opposite the recess 11 so that the opening in the fastening element 12 is visible from a viewing point within the recess 11.

Figure 2:
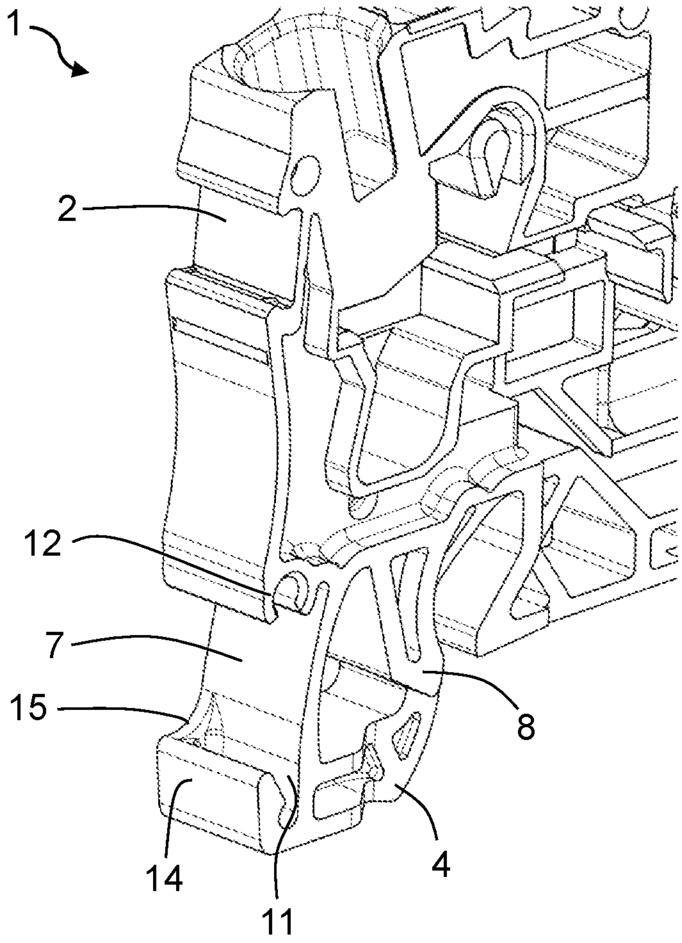
FIG. 2 shows a partial perspective representation of the conductor terminal according to FIG. 1, FIG. shows the conductor terminal with the actuating element in a comparable representation as FIG. 2.

FIG. 2 shows the part of the terminal housing 2 showing the first locking foot 4 in an enlarged representation without the actuating element 10. It can be seen that the fastening element 12 has a recess with a semicircular inner contour which has a slit-like opening to one circumferential side of the semicircular inner contour pointing towards the recess 11. The recess 11 at the lower end of the first locking foot 4 is bounded by a force absorption section 14, through which the actuating force is transmitted from the actuating element 10 for the displacement of the first locking foot 4 to the first locking foot 4. It can be seen that the recess 11 is open in the direction of the fastening element 12 and is also open to one side (here on the right). On the other side (here on the left), the recess 11 is bounded by a wall 15. A comparable boundary wall can also limit the recess in the fastening element 12 to the same side, i.e., here on the left.

Figure 3:
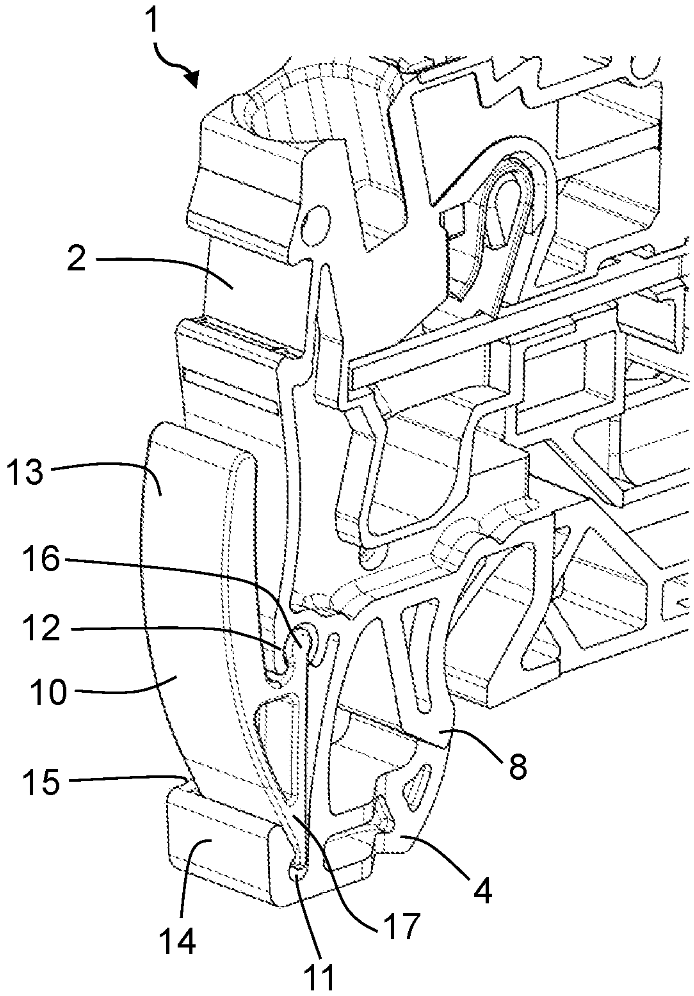

As FIG. 3 shows, the actuating element 10 has a fastening section 16 which is adapted in terms of its shape to the inner contour of the recess in the fastening element 12. The actuating element 10, which in this case is designed as a pivoting actuating lever, also has a displacement section 17, which is formed at a free end of the actuating element 10. The displacement section 17 is immersed in the recess 11 when the actuating element 10 is in the state of being attached to the terminal housing 2 and is essentially form-fitting therein, wherein a certain amount of play is permissible.

If a compressive force is applied to the actuating element 10 at the manual actuation section 13, the actuating element 10 pivots around the swivel bearing formed by the fastening section 16 and the recess in the fastening element 12 so that the displacement section 17 performs a movement that points away from the second locking foot 5. As a result, the first locking foot 4 is elastically displaced so that the conductor terminal can essentially be removed from or attached to a DIN rail without force.

FIG. 4 again illustrates the individual elements of the actuating element 10. As can be seen, the actuating element 10 in the displacement section 17 is essentially triangular or at least approximately triangular in lateral view, wherein there may be a pointed end section 18 towards the free end. It can also be seen that the fastening section 16 in this embodiment has a semicircular outer contour.

Figure 5:
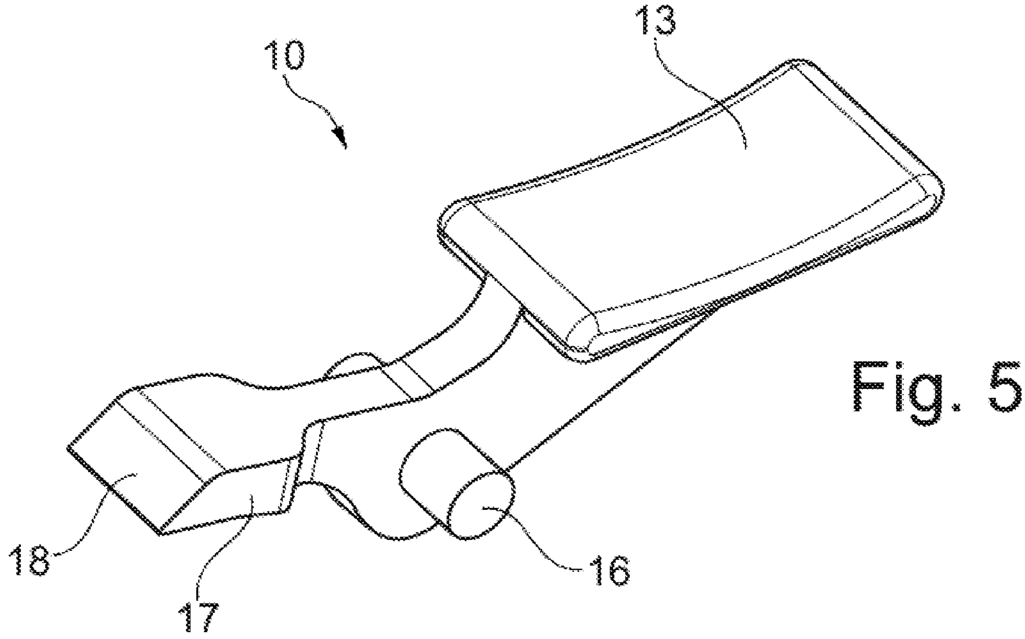
FIG. 5 shows another embodiment of an actuating element in a perspective representation.

The embodiment of the actuating element 10 shown in FIG. 5 in turn has a manual actuation section 13 for manual actuation, a fastening section 16 for attachment to the fastening element 12 on the terminal housing 2, and a displacement section 17 having a beveled end section 18. The fastening section 16 is located between manual actuation section 13 and the displacement section 17. For example, the fastening section 16 may be formed by two pins or axle stubs protruding opposite each other from a base body of the actuating element 10.

Figure 4:
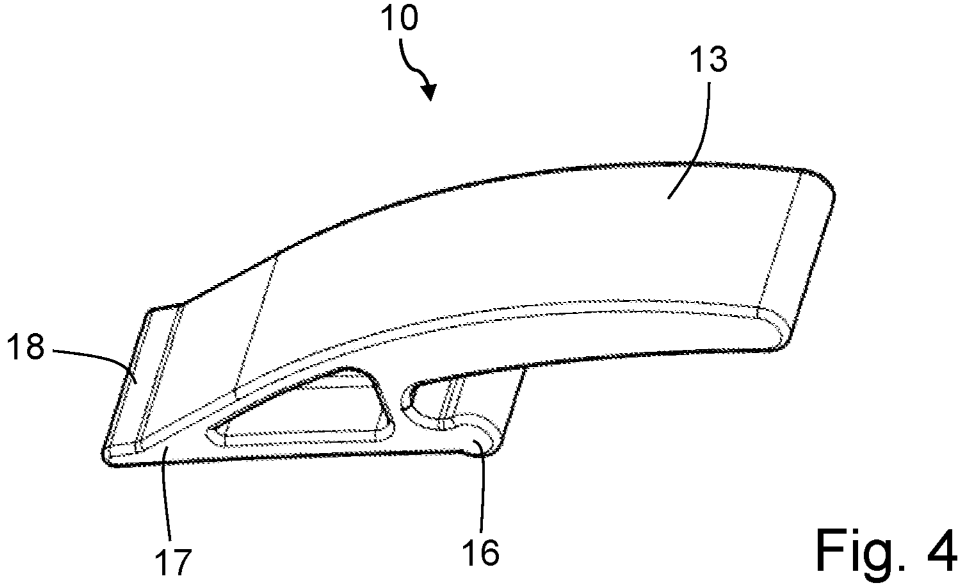
FIG. 4 shows an actuating element in a perspective representation.

As can be seen, both in the embodiment of FIG. 4 and in the embodiment of FIG. 5, the manual actuation section 13 is formed on a lever arm of the lever-type actuating element 10; the displacement section 17 is formed on a load arm of the actuating element 10.

Figure 6:
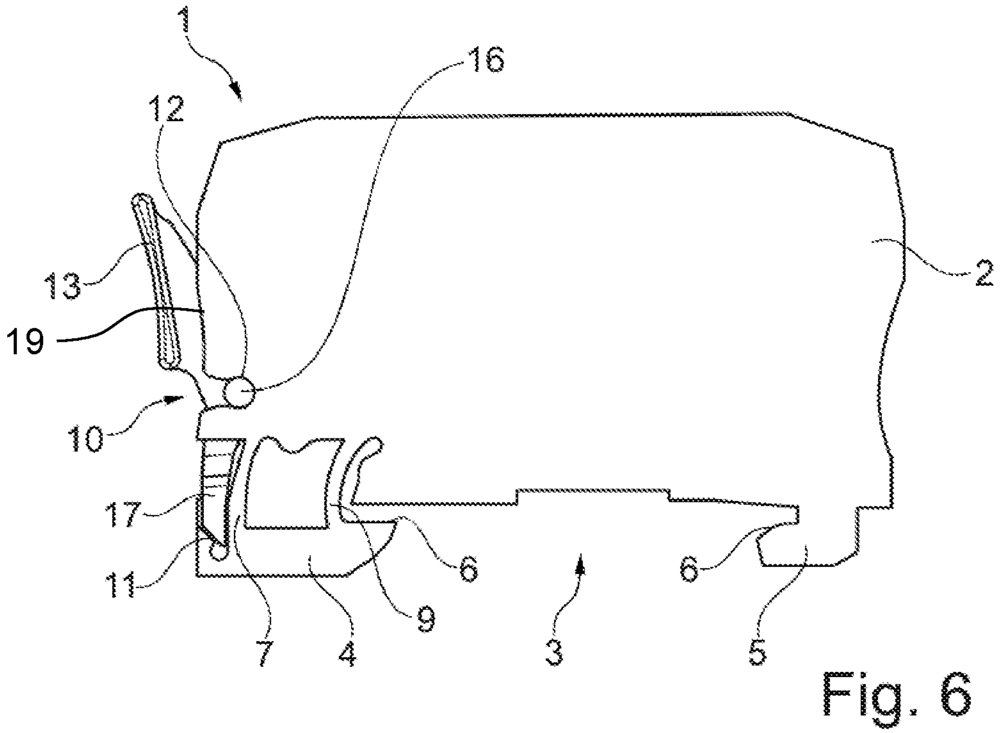
FIG. 6 shows a conductor terminal with an actuating element according to FIG. 5 in a side view.

FIG. 6 shows in a similar view to FIG. 1 the arrangement of the actuating element 10 according to FIG. 5 on a conductor terminal 1. The conductor terminal 1 can be designed in a comparable way to the conductor terminal 1 according to FIG. 1.

Figure 7:
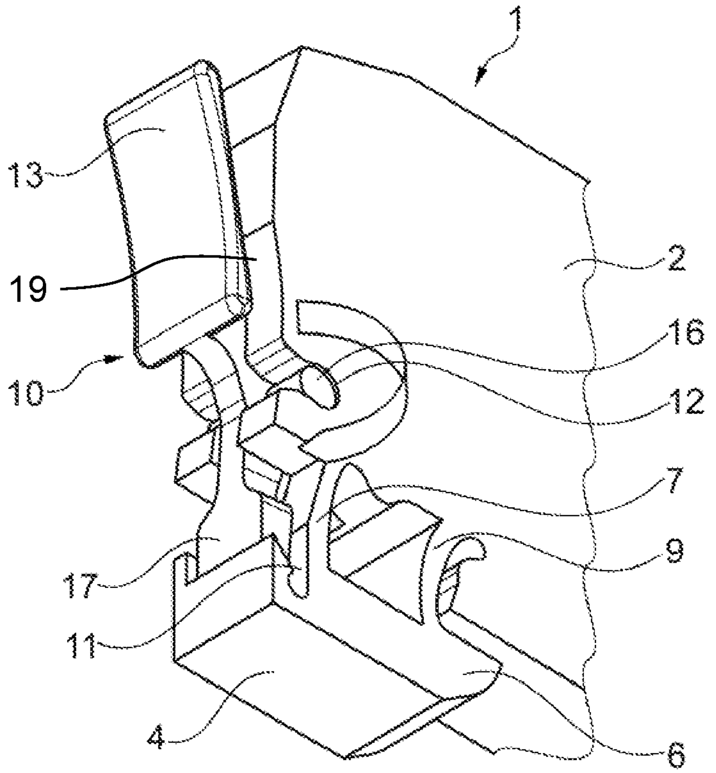
FIG. 7 shows a partial view of the conductor terminal according to FIG. 6 in a perspective view.
Figure 8:
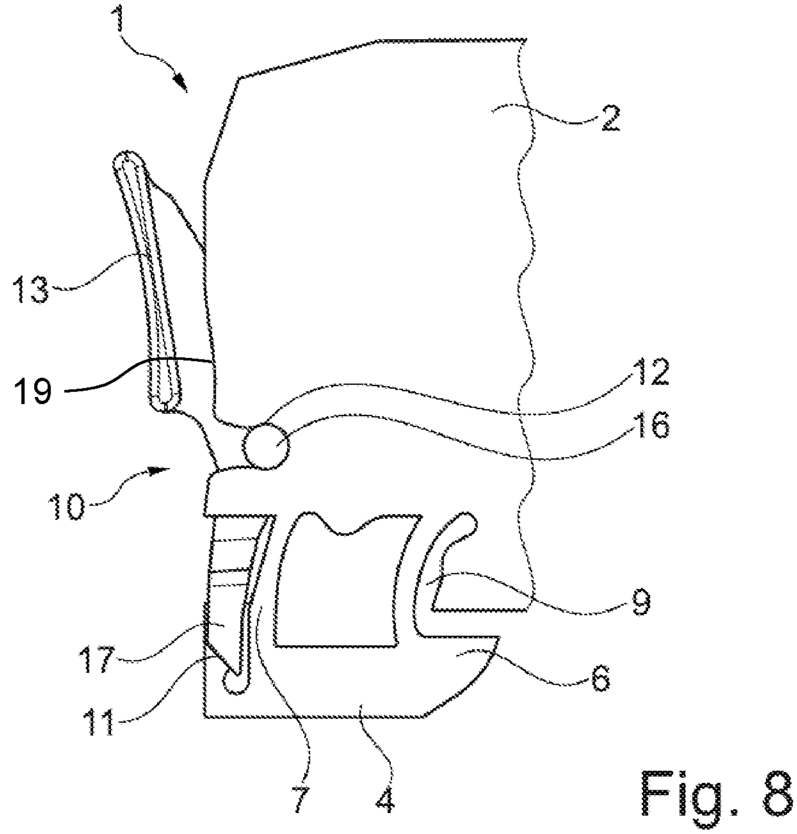
FIG. 8 shows the partial view according to FIG. 7 in a side view.

As the enlarged illustrations in FIGS. 7 and 8 illustrate, in contrast to the embodiment of FIG. 1, the fastening element 12 of the conductor terminal according to FIGS. 6 to 8 is designed with a recess which has an opening which leads into a side wall 19 through which the actuating element 10 can be inserted or snapped into place with its fastening section 16. The displacement section 17 is then at least partially in the recess 11.

The actuating element 10 can then be subjected to a compressive force on the manual actuation section 13 to carry out a displacement of the first locking foot 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A terminal block comprising:

a terminal housing;

a locking device for snapping the terminal housing onto a DIN rail, wherein the locking device has a first locking foot that is elastically displaceable relative to the terminal housing, the first locking foot having a recess for holding an actuating element with which the first locking foot is elastically displaced; and a fastening element arranged on the terminal housing and/or on the locking device at a distance from the recess of the first locking foot, the actuating element being fixable in the fastening element in a loss-proof manner via a positive fit and/or frictional connection.

2. The terminal block according to claim 1, wherein the fastening element has a recess with a circular inner contour.

3. The terminal block according to claim 2, wherein the circular inner contour extends over a radians of more than 180°.

4. The terminal block according to claim 1, wherein the fastening element is disposed at a distance from the recess of the first locking foot for receiving the actuating element, the distance being greater than a depth of the recess of the first locking foot.

5. The terminal block according to claim 1, wherein the fastening element has an opening pointing in the direction of the recess of the first locking foot.

6. The terminal block according to claim 1, wherein the recess of the first locking foot is tapered in cross-section in a direction pointing away from the fastening element.

7. The terminal block according to claim 1, wherein the first locking foot is integrally connected to the terminal housing via a first web and a second web.

8. The terminal block according to claim 7, wherein the terminal housing has a stop that protrudes into a space between the first web and the second web of the first locking foot, and wherein a maximum possible displacement of the first locking foot is reached when the second web of the first locking foot contacts the stop.

9. A set comprising:

the terminal block according to claim 1; and an actuating element having a fastening section and a displacement section, wherein the fastening section is fixed to the fastening element of the terminal housing by a positive fit and/or frictional connection, and wherein the displacement section engages in the recess of the first locking foot to hold the actuating element when the actuating element is fixed to the fastening element of the terminal housing via the fastening section.

10. The set according to claim 9, wherein the displacement section is formed at a free end of the actuating element.

11. The set according to claim 9, wherein the actuating element has a manual actuation section for manual actuation of the actuating element for displacing the first locking foot.

12. The set according to claim 9, wherein the actuating element is a pivoting actuating lever that is swivelable around a swivel bearing, wherein the swivel bearing is at least partially formed by the fastening element of the terminal housing and the fastening section of the actuating element held in the fastening element.

13. The set according to claim 11, wherein the manual actuation section is formed on a lever arm of the actuating element protruding from a region of the actuating element, in which the fastening section is disposed, in a different direction than a load arm of the actuating element on which the displacement section is formed.

14. The set according to claim 9, wherein the actuating element is wholly or predominantly formed of a color that contrasts with a color of the terminal housing.

* * * * *